3,046,283
10-(OMEGA-AMINOALKYLIDENE)-
THIOXANTHENES
Edward L. Engelhardt, Gwynedd Valley, Pa., assignor to Merck & Co., Inc., Rahway, N.J., a corporation of New Jersey
No Drawing. Filed Aug. 19, 1957, Ser. No. 678,961
7 Claims. (Cl. 260—328)

This invention relates to new chemical compounds and to a novel method for preparing them. In particular the invention relates to new thiaxanthene derivatives having the following general formula

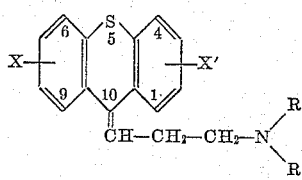

and non-toxic acid addition salts thereof, wherein X and X' respectively represents hydrogen, halogen particularly chlorine or bromine, a lower alkyl radical for example a straight or branched chain alkyl radical having from 1 to about 4 carbon atoms, and a lower alkoxy radical preferably having a straight or branched alkyl chain with from 1 to about 4 carbon atoms; and

is a tertiary amino group and particularly a tertiary amino group selected from the di-lower-alkylamino, 1-piperidyl, 1-pyrrolidyl or 4-morpholinyl groups. One or more of the hydrogens attached to the propylidene side chain can be substituted by a lower alkyl group provided the total number of carbons in all substituent alkyl groups does not exceed four. When one or more of the propylidene hydrogens is substituted by an alkyl group, one of the alkyl substituents can be linked with R' to form a heterocyclic ring with the nitrogen atom.

The compounds of this invention have been found to be valuable therapeutic agents particularly because of their anti-emetic properties. For physiological purposes, these substances are conveniently administered as salts, the identity of the acid being of little importance provided it is non-toxic. The salts are therefore considered to be equivalent to the bases.

The novel process which has been developed to make the compounds of this invention constitutes another feature of this invention. According to this process the Grignard reagent is prepared from the appropriate 3-tertiary aminopropyl halide in tetrahydrofuran. The desired thiaxanthone derivative then is added to the reaction mixture. After hydrolysis of the Grignard adduct, the 10-(3-tertiaryaminopropyl)-10-hydroxythiaxanthene is isolated and dehydrated to the desired 10-(3-tertiaryaminopropylidene)-thiaxanthene which can be isolated as an acid addition salt.

Previous workers have employed ether and mixtures of ether and benzene as solvents in the preparation of basically substituted Grignard reagents. In the case of 3-dimethylaminopropyl chloride, the Grignard reagent is insoluble in ether and the separation of the solid stops the reaction. While it has been discovered that the desired end product can be obtained by carefully controlled portionwise addition of the ketone, it is much more convenient and considerably less time consuming to carry out the process by operating in tetrahydrofuran which permits the formation of the organomagnesium compound to go to completion prior to the addition of the ketone.

The new compounds which are unsymmetrically substituted in the thiaxanthene nucleus may be obtained as a mixture of geometric isomers. When more than one isomer are isolated from a reaction mixture, they are designated in this application as the alpha and beta isomer in the order of isolation. While the mixture exhibits anti-emetic properties, in some instances the activity may be greater in one pure isomer than the other.

This reaction can be schematically illustrated as follows:

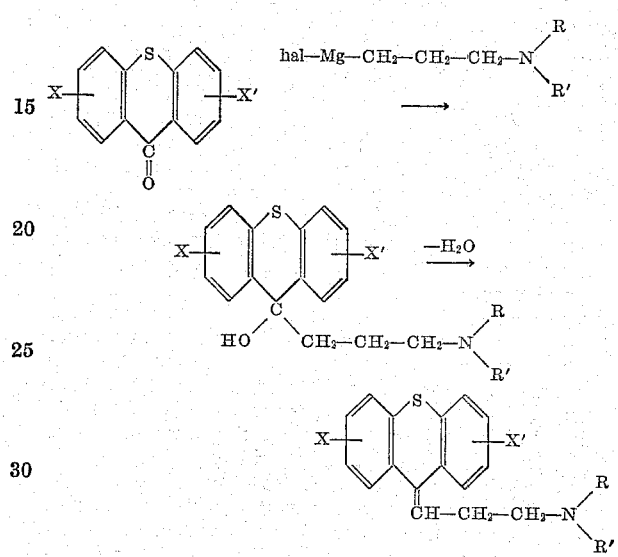

The dehydration can be effected by known procedures employing known dehydrating agents. Dehydrating agents which have been found especially useful are acetyl chloride, thionyl chloride and acetic anhydride. Other dehydrating agents as potassium bisulfate, concentrated hydrochloric acid and the like, can also be used. Solvents which are well adapted to the requirements of this step when acetyl chloride or a similar dehydrating agent is employed are chloroform and methylene chloride.

It has been found that when an unsymmetrically substituted 10-(3-tertiaryaminopropyl)-10-hydroxythiaxanthene compound is converted to a salt prior to treatment with the dehydrating agent the yield of the geometric isomer formed in smaller quantity is increased at the expense of the other isomer. This is advantageous since the isomer formed in smaller quantity frequently is the more active.

A variety of acids can be employed to form the salts of the unsymmetrically substituted thiaxanthene. Strong acids generally are preferred such as the anhydrous acids hydrogen chloride, hydrogen bromide, the sulfonic acids and the like, although for all practical purposes anhydrous hydrogen chloride, because of its availability, can be employed to advantage.

The new compounds and the improved process for making them will be described in more detail in the following illustrative examples. Methods, other than the improved process which constitutes a feature of this invention, that can be employed in making the novel compounds will also be described in the examples.

The melting points of the hydrochloride salts of the 10-propylidenethiaxanthene compounds vary depending upon the starting temperature of the melting point bath and with the rate of heating.

This application is a continuation-in-part of copending United States patent application, Serial Number 536,274 filed September 23, 1955, by James M. Sprague, Edward L. Engelhardt, and Marcia E. Christy and now Patent Number 2,996,503, issued August 8, 1961.

EXAMPLE 1

*10-(3-Dimethylaminopropylidene)-Thiaxanthene Hydrogen Oxalate*

Magnesium turnings, 2.8 g. (0.115 g. atom) was placed in a flask fitted with a mercury sealed stirrer, reflux condenser and a dropping funnel. The apparatus was flushed with dry nitrogen and protected from atmospheric moisture by means of a drying tube. Anhydrous ether (dried over calcium hydride), 50 ml., was added followed by half of 1.25 g. (0.0115 mole) of ethyl bromide. The remainder of the ethyl bromide was added to a solution of 14.0 g. (0.115 mole) of 3-dimethylaminopropyl chloride in 15 ml. of ether and 35 ml. of benzene. This solution was added to the stirred magnesium-ether mixture in portions over a period of 1 hour. The mixture then was stirred at reflux for 1½ hours. The reaction mixture, containing an insoluble colorless solid and unreacted magnesium, was cooled to room temperature. Thiaxanthone, 21.2 g. (0.1 mole) was pulverized and added to the stirred reaction mixture in portions over a period of 15 minutes. The heat liberated was sufficient to induce refluxing, the solid disappeared and a colorless solid began to separate. The solid became yellow and the reaction mixture became more difficult to stir. Benzene, 100 ml. was added as the addition of the ketone was completed. The reaction mixture was then refluxed and stirred for 2 hours, then cooled in ice and treated with 50 ml. of water. After warming till the solvent was at reflux, the mixture was filtered, and the filter cake washed with hot benzene. The organic layer was separated and extracted with 3 N hydrochloric acid until the aqueous layer was no longer colored (red). The acid extract was made basic and the yellow oil that separated extracted into ether. The ether extract was washed with water, dried over sodium sulfate and the ether evaporated. The residue, a viscous yellow oil, weighed 12.5 g., and was 10-(3-dimethylaminopropylidene)-thiaxanthene.

A portion of the base was converted to the hydrogen oxalate that melted at 155–157° C. after three recrystallizations from absolute alcohol.

*Analysis.*—Calculated for $C_{18}H_{19}NS \cdot C_2H_2O_4$: C, 64.67; H, 5.70; N, 3.77. Found: C, 65.10; H, 5.90; N, 3.82.

EXAMPLE 2

*2-Chloro-10-(3-Dimethylaminopropylidene)-Thiaxanthene Hydrochloride*

STEP A

Magnesium turnings, 4.86 g. (0.2 g. atom) was placed in a 500 ml. reaction flask fitted as described in Example 1. Tetrahydrofuran, 50 ml. and calcium hydride, 500 mg. were added. Ethyl bromide, 2.18 g. and a crystal of iodine then were added. A vigorous reaction set in that evolved sufficient heat to induce refluxing. After 5 minutes, a solution of 3-dimethylaminopropyl chloride (dried over calcium hydride) in 50 ml. of tetrahydrofuran was added to the refluxing solution at such a rate that gentle refluxing was maintained. The addition required 25 minutes. The reaction mixture was stirred at reflux for an additional 30 minutes when nearly all of the magnesium had dissolved and determination of magnesium in an aliquot of the solution showed that an 82% yield of Grignard reagent had been obtained. The reaction mixture was cooled in an ice bath and stirred while 24.67 g. (0.1 mole) of 2-chlorothiaxanthone was added over a period of 10 minutes. The reaction was stirred at room temperature for 30 minutes then allowed to stand overnight in the refrigerator. The tetrahydrofuran was evaporated at 50° C. under reduced pressure. Benzene, 150 ml., was added to the residue. The mixture was hydrolyzed in the cold by the dropwise addition of 50 ml. of water. The benzene layer was separated by decantation and the gelatinous precipitate washed with two 100 ml. portions of benzene. The precipitate was then mixed with diatomaceous earth, collected on a filter and washed with water and extracted with two 100 ml. portions of boiling benzene. The aqueous filtrate was extracted with 50 ml. of benzene, the combined benzene extracts washed with water and evaporated to dryness under reduced pressure. The crystalline residue, M.P. 140–147° C., weighed 30.8 g. Recrystallization from a mixture of benzene and hexane gave 27.6 g. (83%) of 2-chloro-10-(3-dimethylaminopropyl)-10-hydroxythiaxanthene, M.P. 152–154° C. Analytically pure material from another experiment melted at 153–154° C.

*Analysis.*—Calculated for $C_{18}H_{20}ONClS$: C, 64.75; H, 6.04; N, 4.20. Found: C, 64.80; H, 5.95; N, 4.20.

STEP B 3.34 g. (0.01 mole) of the thus obtained 2-chloro-10-(3-dimethylaminopropyl)-10-hydroxythiaxanthene was dissolved in 15 ml. of dry, alcohol-free chloroform. Acetyl chloride, 2.36 g. (0.03 mole) was added and the clear yellow solution was refluxed for one hour in a system protected by a drying tube. The solvent then was evaporated on the steam-bath under reduced pressure and the residue dissolved in absolute alcohol. The hydrochloride of 2-chloro-10-(3-dimethylaminopropylidene)-thiaxanthene was precipitated by the cautious addition of absolute ether. After drying at 70° C. the yield of white crystalline 2-chloro-10-(3-dimethylaminopropylidene)-thiaxanthene hydrochloride, M.P. 189–190° C. (to a cloudy melt), was 3.20 g. (90%). This material is a mixture of geometric isomers.

*Analysis.*—Calculated for $C_{18}H_{18}NClS \cdot HCl$: C, 61.36; H, 5.43; N, 3.97. Found: C, 61.51; H, 5.58; N, 3.89.

EXAMPLE 3

*α-Isomer of 2-Chloro-10-(3-Dimethylaminopropylidene)-Thiaxanthene Hydrochloride*

The hydrochloride, obtained as described in Example 2 (step B), 35.23 g. (0.1 mole) was dissolved in 200 ml. of water. The solution was made basic with 50 ml. of 10 N sodium hydroxide and the mixture extracted with three 100 ml. portions of benzene. The combined benzene extracts were washed with 50 ml. of water in two portions and the solvent evaporated on the steam-bath under reduced pressure. The viscous yellow oily base weighed 31.14 g. (99%). The base was stored in the dark at room temperature for 11 days. During this time the α-isomer separated in the form of pale yellow crystals. The semi-solid mixture was triturated with 50 ml. of petroleum ether (30–60° C.) and the insoluble solid collected and recrystallized repeatedly from hexane-petroleum ether mixtures and alcohol-water mixtures until a constant M.P. of 98–99° C. was attained. The α-isomer of 2-chloro-10-(3-dimethylaminopropylidene)-thiaxanthene then was converted to the hydrochloride that melted at 211.5–212.5° C. (dec.).

*Analysis.*—Calculated for $C_{18}H_{18}NClS \cdot HCl$: N, 3.97. Found: N, 3.99.

EXAMPLE 4

*β-Isomer of 2-Chloro-10-(3-Dimethylaminopropylidene)-Thiaxanthene Hydrochloride*

The petroleum ether filtrate obtained in Example 3 was cooled to −15° C. and the oily crystals that separated removed. Evaporation of the solvent from the filtrate left 14.96 g. of a deep yellow oily residue. This base, 2-chloro-10-(3-dimethylaminopropylidene)-thiaxanthene, was converted to the hydrogen oxalate that melted at 188.5–189.5° C. after repeated recrystallization from alcohol-water mixtures. The base then was liberated from the oxalate and converted to the hydrochloride that melted at 205.5–206.5° C. after crystallization from a mixture of absolute alcohol and absolute ether.

*Analysis.*—Calculated for $C_{18}H_{18}NClS \cdot HCl$: N, 3.97. Found: N, 3.97.

EXAMPLE 5

2-Bromo-10-(3-Dimethylaminopropylidene)-Thiaxanthene Hydrochloride

By replacing the 2-chlorothiaxanthone used in Example 2 by an equimolecular quantity of 2-bromothiaxanthone, and following substantially the same procedures described in steps A and B thereof, there was obtained 2-bromo-10-(3-dimethylaminopropylidene) - thiaxanthene hydrochloride. The mixture of isomers melted at 202–203° C.

*Analysis.*—Calculated for $C_{18}H_{18}NBrS \cdot HCl$: C, 54.48; H, 4.83; N, 3.53. Found: C, 54.75; H, 5.12; N, 3.45.

EXAMPLE 6

2-Methoxy-7-Chloro-10[3-(4-Morpholinyl)-Propylidene]-Thiaxanthene Hydrochloride By replacing the 3-dimethylaminopropyl chloride and the 2-chlorothiaxanthone used in Example 2 by an equimolecular quantity of 3-(4-morpholinyl)-propyl chloride and 2-methoxy-7-chlorothiaxanthone respectively, and following substantially the same procedures described in steps A and B of Example 2, there was obtained 2-methoxy - 7 - chloro - 10 - [3 - (4-morpholinyl)-propylidene]-thiaxanthene hydrochloride.

EXAMPLE 7

3,8-Di-Propoxy-10-(3-Dipropylaminopropylidene)-Thiaxanthene Hydrochloride

By replacing the 3-dimethylaminopropyl chloride and the 2-chlorothiaxanthone used in Example 2 by an equimolecular quantity of 3-dipropylaminopropyl chloride and 3,8-dipropoxythiaxanthone respectively and following substantially the same procedures described in steps A and B of Examples 2, there was obtained 3,8-di-propoxy-10-(3-dipropylaminopropylidene)-thiaxanthene hydrochloride.

EXAMPLE 8

2-Chloro-8-Ethyl-10-(2-Methyl-3-Dimethylaminopropylidene)-Thiaxanthene Hyrochloride By replacing the 2-chlorothiaxanthone and the 3-dimethylaminopropyl chloride used in Example 2 by an equimolecular quantity of 2-chloro-8-ethylthiaxanthone and 2-methyl-3-dimethylaminopropyl chloride respectively, and following substantially the same procedures described in steps A and B of Example 2, there was obtained 2-chloro-8-ethyl-10-(2-methyl-3-dimethylaminopropylidene)-thiaxanthene hydrochloride.

EXAMPLE 9

2-Chloro-10-[3-(1-Piperidyl)-Propylidene]-Thiaxanthene Hydrochloride

By replacing the 3-dimethylaminopropyl chloride used in Example 2 by an equimolecular quantity of 3-(1-piperidyl)-propyl chloride, and following substantially the same procedure described in steps A and B of Example 2, there was obtained 2-chloro-10-[3-(1-piperidyl)-propylidene]-thiaxanthene hydrochloride. The mixture of geometric isomers melted at 241–245° C.

The mixture of geometric isomers was crystallized from absolute alcohol. The less soluble fraction was obtained in two crops in a yield of 63%, M.P. 250–252° C. This material (designated the α-form) was converted to the base that was recrystallized to a constant melting point of 95–96° C. from petroleum ether followed by recrystallization from a mixture of alcohol and water.

*Analysis.*—Calculated for $C_{21}H_{22}NClS$: C, 70.87; H, 6.23; N, 3.94. Found: C, 70.97; H, 6.14; N, 3.96.

The alcohol mother liquors from which the α-form as the hydrochloride was removed was evaporated on the steam bath under reduced pressure. The residue was dissolved in isopropyl alcohol and the solution diluted with absolute ether to incipient cloudiness. The product, M.P. 243–245° C. (dec.) was obtained in a yield of 28%. This product (designated the β-form) was converted to the base that was recrystallized to a constant M.P. of 58–59° C. from mixtures of petroleum ether and hexane.

*Analysis.*—Calculated for $C_{21}H_{22}NClS$: C, 70.87; H, 6.23; N, 3.94. Found: C, 71.59; H, 6.62; N, 3.66.

EXAMPLE 10

7-Propyl-10-[3-(1-Pyrrolidyl)-Propylidene]-Thiaxanthene Hydrochloride

By replacing the 3-dimethylaminopropyl chloride and the 2-chlorothiaxanthone used in Example 2 by an equimolecular quantity of 3-(1-pyrrolidyl)-propyl chloride and 7-propylthiaxanthone respectively, there was obtained 7-propyl - 10 - [3 - (1 - pyrrolidyl) - propylidene] - thiaxanthene hydrochloride.

EXAMPLE 11

α- and β-Forms of 2-Chloro-10-(3-Diethylaminopropylidene)-Thiaxanthene Hydrochloride

STEP A

The Grignard reagent was prepared from 4.86 g. (0.2 g. atom) of magnesium and 29.9 g. (0.2 mole) of 3-diethylaminopropyl chloride following essentially the procedure described in step A of Example 2. The reaction mixture then was stirred and cooled in an ice-bath while 24.67 g. (0.1 mole) of 2-chloro-thiaxanthone was added over a period of 10 minutes. The mixture then was allowed to warm up to room temperature and stirred at refluxing for 1 hour. The reaction mixture then was distilled until 75 ml. of distillate had been collected and the residue diluted with 150 ml. of benzene. The reaction mixture was hydrolyzed in the cold by the dropwise addition of 70 ml. of 30% ammonium chloride solution. The benzene layer was separated by decantation and the gelatinous solid extracted with two 100 ml. portions of benzene. The solid then was stirred with 50 ml. of 10 N sodium hydroxide, mixed with diatomaceous earth and the mixture filtered. The filtrate was extracted with 50 ml. of benzene and the combined benzene extracts washed with water and evaporated to dryness. The residue was an oily solid weighing 36.6 g., M.P. 108–112° C. (sintering at 105°). The product was recrystallized from a mixture of benzene and hexane to give 29.75 g. (82%) of 2-chloro-10-(3-diethylaminopropyl)-10-hydroxythiaxanthene, M.P. 115–117° C. Recrystallization from mixtures of benzene and hexane yielded the product with a constant M.P. of 116.2–118.2° C.

*Analysis.*—Calculated for $C_{20}H_{24}ONClS$: C, 66.37; H, 6.68; N, 3.87. Found: C, 66.14; H, 6.97; N, 3.87.

STEP B

The product obtained in step A, 7.24 g. (0.02 mole) was dissolved in 30 ml. of dry, alcohol-free chloroform and 4.72 g. (0.06 mole) of acetyl chloride added. The solution was refluxed for 1 hour and the solvent evaporated on the steam-bath under reduced pressure. The 2 - chloro - 10 - (3 - diethylaminopropylidene) - thiaxanthene hydrochloride was separated into the α- and β-forms by dissolving the residue, 6.95 g. (91%), in a mixture of absolute alcohol and absolute acetone and fractionally precipitating with absolute ether.

The α-form, 4.25 g. (55.5%); melted at 220.3–222.3° C. after repeated recrystallization from a mixture of absolute ethanol and absolute ether.

*Analysis.*—Calculated for $C_{20}H_{22}NClS \cdot HCl$: C, 63.15; H, 6.09; N, 3.68. Found: C, 62.96; H, 6.13; N, 3.66.

The β-form, 600 mg. (7.85%), melted at 153.8–155.3° C. after repeated recrystallization from acetone-ether mixtures.

*Analysis.*—Calculated for $C_{20}H_{22}NClS \cdot HCl$: C, 63.15; H, 6.09; N, 3.68. Found: C, 63.12; H, 6.24; N, 3.65.

The quantity of the β-isomer that can be isolated can be improved by treating the β-form of the base with (+) tartaric acid as described in the following example.

EXAMPLE 12

α-and β-Forms of 2-Chloro-10-(3-Diethylaminopropylidene)-Thiaxanthene

2 - chloro - 10 - (3 - diethylaminopropyl) - 10 - hydroxythiaxanthene was dehydrated following the procedure of step B, Example 2. The 2-chloro-10-(3-diethylaminopropylidene)-thiaxanthene hydrochloride thus obtained contained approximately 23% of the β-isomer by infrared analysis. Trituration of 10.0 g. of the product with 25 ml. of cold acetone afforded 7.45 g. (74.5%) of the insoluble α-form, M.P. 219–220° C., containing 6% of the β-form by infrared analysis. The acetone filtrate was evaporated on the steam bath under reduced pressure. The residue was dissolved in water and the solution made basic with 10 N sodium hydroxide. The mixture was extracted with hexane and the extract evaporated leaving 1.55 g. (17.3%) of the yellow oily base, the β-form of 2-chloro-10-(3-diethylaminopropylidene)-thiaxanthene. Infrared analysis indicated a β-isomer content of 90%. The base was treated with (+) tartaric acid in absolute methanol and the hydrogen (+) tartrate, 1.75 g., (13.6%) M.P. 151–153° C., precipitated by the addition of absolute ether. The 2-chloro-10-(3-diethylaminopropylidene)-thiaxanthene hydrogen (+) tartrate contained 91% of the β-form by infrared analysis.

The quantity of β-isomer can be markedly increased by initially forming a salt of the 2-chloro-10-(3-diethylaminopropyl)-10-hydroxythiaxanthene and then dehydrating, as illustrated in the following example. While this example describes the process employing 2-chloro-10-(3-diethylaminopropyl)-10-hydroxythiaxanthene as the starting material, the process also is effective in increasing the yield of the geometric isomer formed in smaller quantity by a process such as that described in Example 11, step B, when other, unsymmetrically substituted 10-(3-tertiary-aminopropyl)-10-hydroxythiaxanthenes are employed which can be dehydrated to a product falling within the scope of the general structure illustrated in column 1.

EXAMPLE 13

(β) 2-Chloro-10-(3-Diethylaminopropylidene)-Thiaxanthene Hydrogen (+) Tartrate

STEP A.—DEHYDRATION

2 - chloro - 10 - (3 - diethylaminopropyl) - 10 - hydroxythiaxanthene, 7.24 g. (0.02 mole), prepared as described in Example 11, dissolved in 30 ml. of chloroform (Merck, reagent). The solution was saturated with dry hydrogen chloride. Acetyl chloride, 4.71 g. (0.06 mole), was added. A moderately vigorous evolution of hydrogen chloride took place that subsided after approximately 15 minutes. The mixture was heated to refluxing on the steam bath for 1 hour. The solvent then was evaporated and the residue dried to constant weight on the steam bath under reduced pressure. The product weighed 8.15 g. (theory 7.61 g.) and contained approximately 37% of the β-isomer as estimated by infrared analysis.

STEP B.—SEPARATION OF THE ISOMERS

The mixture of hydrochlorides, 8.10 g., was pulverized and extracted in the cold with 30 ml. of acetone. After extracting with an additional 10 ml. of acetone, the insoluble α-isomer was dried at 70° C. The yield of product, M.P. 215–217° C., was 4.65 g. (61.5%).

STEP C.—LIBERATION OF THE β BASE

Evaporation of the acetone extracts gave 3.07 g. of a brown syrup. This material, the crude β hydrochloride, was dissolved in 35 ml. of water, the solution made basic with 10 ml. of 10 N sodium hydroxide and extracted with 100 ml. of hexane. (The relatively large volumes of hexane were employed for this extraction in order that the base would be suitable for infrared analysis. On a preparative scale, benzene might be a more suitable solvent for the extraction.) After two additional extractions employing 35 ml. of hexane for each, the combined extracts were washed with two 35 ml. portions of water and evaporated on the steam bath under reduced pressure. The β base weighed 2.52 g. (36.9%) and contained 86–87% of the β form by infrared analysis.

STEP D.—PREPARATION OF THE TARTRATE

The β base, 2.42 g. (0.00704 mole), was dissolved in 10 ml. of absolute methanol and the solution treated with 1.16 g. (0.00773 mole) of (+) tartaric acid. The solution was diluted to turbidity with absolute ether (approximately 15 ml. being required) and allowed to crystallize at room temperature. The yield of product, 2-chloro-10 - (3 - diethylaminopropylidene) - thiaxanthene hydrogen (+) tartrate, M.P. 150.5–152° C., was 2.98 g. (31.6%).

*Analysis.*—Calculated for $C_{20}H_{22}NClS \cdot C_4H_6O_6$: C, 58.35; H, 5.71; N, 2.84. Found: C, 58.08; H, 5.69; N, 2.89.

The base regenerated from the tartrate contained 92% of the β isomer as determined by infrared analysis.

EXAMPLE 14

2 - Methoxy - 10 - (3 - Dimethylaminopropylidene)-Thiaxanthene Hydrogen Oxalate

STEP A

The Grignard reagent was prepared from 2.61 g. (0.107 mole) of magnesium and 13.05 g. (0.0539 mole) of 3-dimethylaminopropyl chloride in 50 ml. of dry tetrahydrofuran essentially as described in step A of Example 2. 2-methoxythiaxanthone, 13.00 g. (0.0537 mole) was added to the reaction mixture at 25° C. with stirring. After stirring for 15 minutes at room temperature, the mixture was heated to refluxing for 1 hour. The product was isolated following hte procedure described in step A of Example 2. The yield of 2-methoxy-10-(3-dimethylaminopropyl) - 10 - hydroxythiaxanthene was 14.17 g. (80%) after recrystallization from a mixture of benzene and hexane. Further recrystallization from mixtures of benzene and hexane yielded the product melting at 123–124° C.

*Analysis.*—Calculated for $C_{19}H_{23}O_2NS$: C, 69.26; H, 7.04; N, 4.25; S, 9.73. Found: C, 69.24; H, 6.98; N, 4.33; S, 9.61.

STEP B

The product obtained in step A, 8.87 g. (0.0269 mole) was dissolved in 40 ml. of dry, alcohol-free chloroform and the solution treated with 6.35 g. (0.0809 mole) acetyl chloride. After refluxing the solution for one hour, the solvent was evaporated on the steam-bath under reduced pressure. The residue was dissolved in 50 ml. of water and the solution was made basic with 10 ml. of 5 N sodium hydroxide. The mixture was extracted with benzene and the extract evaporated leaving the red oily base, 2-methoxy-10-(3-dimethylaminopropylidene)-thiaxanthene. The base was treated with oxalic acid in absolute alcohol solution and the hydrogen oxalate precipitated by addition of absolute ether. After recrystallization from alcohol-ether mixtures the 2-methoxy-10-(3 - dimethylaminopropylidene) - thiaxanthene hydrogen oxalate melted at 135–138° C. (sintered at 132° C.).

*Analysis.*—Calculated for $C_{19}H_{21}ONS \cdot C_2H_2O_4$: C, 62.82; H, 5.77; N, 3.49. Found: C, 62.70; H, 5.87; N, 3.51.

EXAMPLE 15

2,8 - Dichloro - 10 - (3 - Dimethylaminopropylidene)-Thiaxanthene Hydrochloride

STEP A

The Grignard reagent was prepared from 935 g. (0.384 g. atom) of magnesium and 46.7 g. (0.384 mole) of 3-dimethylaminopropyl chloride, using 3.3 g. of ethyl bromide and employing 150 ml. of tetrahydrofuran as solvent. The procedure of Example 2, step A was followed. To the Grignard solution was added 54 g. (0.192 mole) of 2,8-dichloro-thiaxanthone. After stirring at room temperature for 1 hour, the bulk of the tetrahydrofuran was distilled at reduced pressure keeping the temperature below 50° C. The residue was taken up in benzene and hydrolyzed in the cold by the dropwise addition of 75 ml. of water. The benzene layer was separated and the solid extracted with four 100 ml. portions of hot benzene. The combined benzene extracts were concentrated under reduced pressure and the residue crystallized from a mixture of benzene and hexane. The yield of product, 2,8-dichloro-10-(3-dimethylaminopropyl)-10-hydroxy thiaxanthene, M.P. 191.3–192.3° C., was 46.6 g. The product from a similar experiment melted at 190.8–191.8° C. after repeated crystallization from mixtures of benzene and hexane.

Analysis.—Calculated for $C_{18}H_{19}ONCl_2S$: C, 58.70; H, 5.20; N, 3.80. Found C, 58.77; H, 5.09; N, 3.79.

STEP B

The thus obtained 2,8-dichloro-10-(3-dimethylaminopropyl)-10-hydroxy thiaxanthene, 7.2 g. (0.0195 mole) and 4.72 g. (0.06 mole) of acetyl chloride was dissolved in 30 ml. of alcohol-free chloroform. The solution was refluxed for one hour, then evaporated to dryness on the steam-bath under reduced pressure. The residual solid was taken up in hot alcohol, the solution cooled in ice and treated with 20% aqueous sodium hydroxide. The product solidified rapidly and was collected and dried at 70° C. to obtain 6.7 g. of crude 2,8-dichloro-10-(3-dimethylaminopropylidene)-thiaxanthene, M.P. 92–95° C. Recrystallization from a mixture of alcohol and water gave 5.25 g. of the purified product, M.P. 97.5–99.0° C. The pure product obtained in another experiment melted at 99–100° C. (sintered at 98° C.).

Analysis.—Calculated for $C_{18}H_{17}NCl_2S$: C, 61.71; H, 4.89; N, 4.00. Found: C, 61.66; H, 4.94; N, 3.90.

EXAMPLE 16

*2-Methyl-10-(3-Dimethylaminopropylidene)-Thiaxanthene Hydrochloride*

By replacing the 2-chlorothiaxanthone used in Example 2 by an equimolecular quantity of 2-methylthiaxanthone, and following substantially the same procedures described in steps A and B of Example 2, there was obtained 2-methyl-10-(3-dimethylaminopropylidene)-thiaxanthene hydrochloride, M.P. 196.5–198.5° C.

Analysis.—Calculated for $C_{19}H_{21}NS \cdot HCl$: C, 68.74; H, 6.68; N, 4.22. Found: C, 68.71; H, 6.53; N, 4.23.

EXAMPLE 17

*2-Chloro-10-(3-Dimethylaminopropylidene)-Thiaxanthene Hydrochloride*

STEP A

Magnesium turnings, 6.07 g. (0.25 mole) were ground under benzene in a mortar and placed in a 500 ml. three-necked flask equipped with a mercury sealed stirrer, reflux condenser and dropping funnel. Absolute ether, 110 ml., was added followed by 1.36 g. (0.013 mole) of ethyl bromide. An atmosphere of hydrogen was maintained in the apparatus throughout the reaction. A solution of 33.2 g. (0.2 mole) of 3-dimethylaminopropyl bromide in 146 ml. of absolute ether then was added at such a rate that refluxing was maintained. The addition required 35 minutes. 2-chlorothiaxanthone, 16.0 g. (0.065 mole) was added in portions of 4.0 g. at intervals of 30 minutes. The reaction mixture then was refluxed for 1 hour. The reaction mixture was treated with 100 ml. of water with stirring and cooling, then diluted with 100 ml. of benzene and filtered through a mat of glass wool. The filter cake was extracted with three 100 ml. portions of hot benzene and the combined extracts evaporated to give 20.8 g. of crude 2-chloro-10-(3-dimethylaminopropyl)-10-hydroxythiaxanthene. The purified product was obtained by a process of recrystallization and extraction of the mother liquors by citric acid, the base was liberated from the citric acid solution by sodium hydroxide. The combined yield was 61%, M.P. 152–153° C.

STEP B

The thus obtained 2-chloro-10-(3-dimethylaminopropyl)-10-hydroxythiaxanthene was dehydrated by substantially the same procedure described in step B, Example 2, to 2-chloro-10-(3-dimethylaminopropylidene)-thiaxanthene hydrochloride.

EXAMPLE 18

*2-Chloro-10-(3-Dimethylaminopropylidene)-Thiaxanthene Hydrochloride*

STEP A

The Grignard reagent was prepared from 6.07 g. (0.25 mole) of magnesium and 24.3 g. (0.2 mole) of dimethylaminopropyl chloride in 256 ml. of absolute ether following the procedure of Example 17. 2-chlorothiaxanthone, 24.67 g. (0.1 mole) was added in 5 portions at 30 minute intervals. The product was isolated substantially as described in Example 17. The yield of recrystallized 2-chloro-10-(3-dimethylaminopropyl)-10-hydroxythiaxanthene, M.P. 152.5–154.0° C., was 15.24 g. (46%).

STEP B

The thus obtained 2-chloro-10-(3-dimethylaminopropyl)-10-hydroxythiaxanthene was dehydrated by substantially the same procedure described in step B, Example 2, to 2-chloro-10-(3-dimethylaminopropylidene)-thiaxanthene hydrochloride.

EXAMPLE 19

*10-(3-Dimethylaminopropylidene)-Thiaxanthene Hydrochloride*

STEP A

A Grignard reagent was prepared from 14 g. (0.115 mole) of 3-dimethylaminopropyl chloride and 2.8 g. (0.115 g. atom) of magnesium in 50 ml. of dry anisole and 30 ml. of absolute ether in a nitrogen atmosphere, using 1.25 g. (0.0115 mole) of ethyl bromide as an initiator and stirring at 50° C. for 3½ hours.

Anisole, 50 ml., was added and the mixture cooled to 25° C. Thiaxanthone, 21.2 g. (0.1 mole), was added in portions over a 15 minute period. The reaction mixture was stirred for 30 minutes at room temperature and for 90 minutes on the steam bath. After hydrolysis with 50 ml. of water, the mixture was filtered hot through diatomaceous earth and the filter cake washed with benzene. The organic layer was separated from the filtrate and the aqueous layer again extracted with benzene. The combined organic extracts were washed with water, dried, and the benzene distilled under reduced pressure. The residual solution was diluted with petroleum ether and after chilling, 10-(3-dimethylaminopropyl)-10-hydroxythiaxanthene, 13.1 g., M.P. 133–136° C. was collected. Several recrystallizations from 20% benzene in hexane afforded the product with a constant M.P. of 146.5–148.5° C.

Analysis.—Calculated for $C_{18}H_{21}ONS$: C, 72.20; H, 7.07; N, 4.68. Found: C, 72.38; H, 7.22; N, 4.65.

STEP B

The thus obtained 10-hydroxythiaxanthene was dehydrated by substantially the same procedure described in step B, Example 2, to 10-(3-dimethylaminopropylidene)-thiaxanthene hydrochloride.

EXAMPLE 20

2 - Chloro - 10 - [3 - (4 - Morpholinyl) - Propylidene]-Thiaxanthene Hydrochloride

STEP A

By replacing the 3-dimethylaminopropyl chloride used in Example 2, step A, by an equimolecular quantity of 3-(4-morpholinyl)-propyl chloride and following substantially the same procedure described in step A of Example 2, there was obtained 2-chloro-10-[3-(4-morpholinyl)-propyl]-10-hydroxy-thiaxanthene, M.P. 113–115° C.

*Analysis.*—Calculated for $C_{20}H_{22}O_2NClS$: C, 63.91; H, 5.90; N, 3.73. Found: C, 64.18; H, 5.90; N, 3.72.

STEP B

The thus obtained 10-hydroxythiaxanthene, 7.52 g. (0.02 mole), was dehydrated following substantially the same procedure in step B, Example 2. The 2-chloro-10-[3 - (4 - morpholinyl) - propylidene] - thiaxanthene hydrochloride melted at 213.5–214.5° C. after repeated recrystallization from a mixture of absolute ethanol and absolute ether.

*Analysis.*—Calculated for $C_{20}H_{20}ONClS \cdot HCl$: C, 60.91; H, 5.37; N, 3.55. Found: C, 61.20; H, 5.43; N, 3.54.

EXAMPLE 21

2 - Chloro - 10 - [3 - (1 - Pyrrolidyl) - Propylidene]-Thiaxanthene Hydrochloride

STEP A

By replacing the 3-dimethylaminopropyl chloride used in Example 2, step A, by an equimolecular quantity of 3-(pyrrolidyl)- propyl chloride and following substantially the same procedure described in step A of Example 2, there was obtained 2-chloro-10-[3-(1-pyrrolidyl)-proply]-10-hydroxythiaxanthene, M.P. 137.5–139° C.

*Analysis.*—Calculated for $C_{20}H_{22}ONClS$: C, 66.74; H, 6.16; N, 3.89. Found: C, 66.66; H, 6.19; N, 3.89.

STEP B

The thus obtained 10-hydroxythiaxanthene, 10.8 g. (0.03 mole), was dehydrated by the procedure described in step B, Example 2. The 2-chloro-10-[3-(1-pyrrolidyl)-propylidene]-thiaxanthene hydrochloride was separated into the α- and β-forms by dissolving the solid residue in absolute alcohol and fractionally precipitating with absolute ether.

The α-form melted at 234–236° C. (dec.) after repeated recrystallization from a mixture of absolute alcohol and absolute ether.

*Analysis.*—Calculated for $C_{20}H_{20}NClS \cdot HCl$: C, 63.47; H, 5.33; N, 3.70. Found: C, 63.74; H, 5.49; N, 3.66.

The β-form was dissolved in water and the solution made basic with 10 N sodium hydroxide and the mixture extracted with benzene. After washing with water, the benzene extract was evaporated on the steam bath under reduced pressure. The β-isomer of 2-chloro-10-[3-(1-pyrrolidyl)-propylidene]-thiaxanthene crystallized after storing at −15° C. and was recrystallized repeatedly from petroleum ether and from hexane until a constant M.P. of 83–85° C. was attained. The base then was converted to the hydrochloride that melted at 188–189° C. after crystallization from acetone.

*Analysis.*—Calculated for $C_{20}H_{20}NClS \cdot HCl$: C, 63.47; H, 5.33; N, 3.70. Found: C, 62.97; H, 5.63; N, 3.68.

EXAMPLE 22

2-Fluoro-10-(3-Diethylaminopropylidene)-Thiaxanthene Hydrochloride, and α- and β-Isomers

STEP A

The Grignard reagent was prepared from 4.86 g. (0.2 g. atom) of magnesium and 29.93 g. (0.2 mole) of 3-diethylaminopropyl chloride in 100 ml. of dry tetrahydrofuran essentially as described in step A of Example 2. 2-fluorothiaxanthone, 23.02 g. (0.1 mole) was added to the chilled reaction mixture with stirring. After stirring for 1 hour at room temperature, the mixture was processed following the procedure described in step A of Example 2. The yield of 2-fluoro-10-(3-diethylaminopropyl)-10-hydroxythiaxanthene was 27.8 g. (80%) after recrystallization from a mixture of alcohol (No. 3A anhydrous) and water. Further recrystallization from mixtures of alcohol (No. 3A anhydorus) and water yielded the product, 2-fluoro-10-(3-diethylaminopropyl) - 10 - hydroxythiaxanthene, melting at 109.5–111° C.

*Analysis.*—Calculated for $C_{20}H_{24}ONSF$: C, 69.53; H, 7.00; N, 4.06. Found: C, 69.55; H, 6.83; N, 4.04.

STEP B

The thus obtained 10-hydroxythiaxanthene, 20.0 g. (0.058 mole), was dissolved in 100 ml. of chloroform and the solution saturated in the cold with dry hydrogen chloride. Acetyl chloride, 13.6 g. (0.174 mole) was added and after 10 minutes at room temperature, the solution was refluxed for 1 hour. The solvent then was evaporated on the steam bath under reduced pressure and the solid residue dried in a vacuum desiccator. The yield of 2-fluoro-10-(3-diethylaminopropylidene)-thiaxanthene hydrochloride was 21.0 g.

STEP C

The hydrochloride, thus obtained, was crystallized from acetone and the more insoluble α-isomer of 2-fluoro-10-(3-diethylaminopropylidene)-thiaxanthene hydrochloride collected and recrystallized repeatedly from acetone until a constant M.P. of 185.5–186.5° C. was attained.

*Analysis.*—Calculated for $C_{20}H_{22}NSF \cdot HCl$: C, 66.01; H, 6.37; N, 3.85. Found: C, 66.09; H, 6.33; N, 3.85.

STEP D

The acetone filtrate was concentrated to one-fourth of the original volume and the β-isomer collected and dissolved in water. The solution was made basic with 10 N sodium hydroxide and the mixture extracted with three portions of benzene. The combined benzene extracts were washed with water and the solvent evaporated on the steam bath under reduced pressure. The oily base, the β-isomer of 2-fluoro-10-(3-diethylaminopropylidene)-thiaxanthene, was converted to the hydrobromide that melted at 170–171° C. after repeated crystallizations from mixtures of absolute ethanol, acetone and absolute ether.

*Analysis.*—Calculated for $C_{20}H_{22}NSF \cdot HBr$: C, 58.81; H, 5.68; N, 3.43. Found: C, 58.79; H, 5.61; N, 3.38.

EXAMPLE 23

4-Chloro-10-(3-Dimethylaminopropylidene)-Thiaxanthene Hydrochloride

STEP A

A solution of 3-dimethylaminopropylmagnesium chloride (0.2 mole) in 100 ml. of dry tetrahydrofuran was prepared following substantially the same procedure described in step A, Example 2. 4-chlorothiaxanthone, 24.67 g. (0.1 mole), was added to the chilled solution and after 1 hour at room temperature, the mixture was processed essentially as described in step A, Example 2. Crystallization of the solid residue from absolute ethanol afforded 4 - chloro - 10 - (3-dimethylaminopropyl)-10-hydroxythiaxanthene, M.P. 127–128° C.

*Analysis.*—Calculated for $C_{18}H_{20}ONClS$: C, 64.75; H, 6.04; N, 4.20. Found: C, 64.89; H, 5.98; N, 4.18.

STEP B

The thus obtained 10-hydroxythiaxanthene, 15.0 g. (0.045 mole) was dehydrated following substantially the same procedure described in step B, Example 2. The 4-chloro - 10 - (3 - dimethylaminopropylidene) - thiaxanthene hydrochloride thus obtained melted at 202–203°

C, after crystallization from a mixture of absolute ethanol and absolute ether.

*Analysis.*—Calculated for $C_{18}H_{18}NClS \cdot HCl$: C, 61.36; H, 5.44; N, 3.89. Found: C, 61.27; H, 5.56; N, 3.91.

EXAMPLE 24

2-Chloro-10-(2,2-Dimethyl-3-Dimethylaminopropyl-idene)-Thiaxanthene Hydrochloride

STEP A

The Grignard reagent was prepared essentially as described in step A of Example 2 from 2.43 g. (0.1 g. atom) of magnesium and 14.97 g. (0.1 mole) of 2,2-dimethyl-3-dimethylaminopropyl chloride, using 1.09 g. of ethyl bromide and employing 100 ml. of dry tetrahydrofuran as solvent. To the chilled solution was added 24.67 g. (0.1 mole) of 2-chlorothiaxanthone and the mixture was stirred for 1 hour at room temperature. The product, 2-chloro-10-(2,2-dimethyl-3-dimethylamino-propyl)-10-hydroxythiaxanthene, was isolated following the procedure described in step A, Example 2. After crystallization of a portion of the product from absolute ethanol, the 2-chloro-10-(2,2-dimethyl-3-dimethylamino-propyl)-10-hydroxythiaxanthene was converted to the hydrochloride that melted at 169.8–170.8° C. after repeated recrystallizations from isopropyl alcohol-absolute ether mixtures.

*Analysis.*—Calculated for $C_{20}H_{24}ONClS \cdot HCl$: C, 60.29; H, 6.33; N, 3.52. Found: C, 60.54; H, 6.33; N, 3.52.

STEP B

The remainder of the 10-hydroxythiaxanthene obtained as described above is dehydrated following substantially the same procedure described in step B, Example 2, thus forming 2-chloro-10-(2,2-dimethyl-3-dimethyl-aminopropyl)-thiaxanthene hydrochloride.

EXAMPLE 25

2-Phenyl-10-(3-Diethylaminopropylidene)-Thiaxanthene Hydrochloride

STEP A

A solution of 3-diethylaminopropylmagnesium chloride (0.2 mole) in 100 ml. of dry tetrahydrofuran was prepared by substantially the same procedure described in step A, Example 2. 2-phenylthiaxanthone, 28.83 g. (0.1 mole), was added to the chilled solution and after 1 hour at room temperature, the reaction mixture was processed following substantially the same procedure described in step A, Example 2. The 2-phenyl-10-(3-diethylaminopropyl)-10-hydroxythiaxanthene thus obtained melted at 152–153° C. after crystallization from alcohol (No. 3A anhydrous).

*Analysis.*—Calculated for $C_{26}H_{29}ONS$: C, 77.38; H, 7.24; N, 3.47. Found C, 77.29; H, 7.25; N, 3.45

STEP B

The thus obtained 10-hydroxythiaxanthene, 18.54 g. (0.046 mole), was dehydrated by substantially the same procedure described in step A, Example 13 to 2-phenyl-10-(3-diethylaminopropylidene)-thiaxanthene hydrochloride. The product was crystallized from a mixture of absolute alcohol and absolute ether. The more insoluble α-form that melted at 211.5–212.5° C. after repeated recrystallization from mixtures of absolute alcohol and absolute ether.

*Analysis.*—Calculated for $C_{26}N_{27}NS \cdot HCl$: C, 73.99; H, 6.69; N, 3.32. Found: C, 74.03; H, 6.82; N, 3.23.

STEP C

The alcohol-ether filtrate was evaporated to dryness and the residue crystallized from a mixture of acetone and absolute ether. The β-form of 2-phenyl-10-(3-diethyl-aminopropylidene)-thiaxanthene hydrochloride melted at 142–144° C. after repeated recrystallization from mixtures of acetone and absolute ether.

*Analysis.*—Calculated for $C_{26}H_{27}NS \cdot HCl$: C, 73.99; H, 6.69; N, 3.32. Found: C, 73.63; H, 6.61; N, 3.37.

EXAMPLE 26

2-Chloro-10-(1-Methyl-3-Piperidylmethylene)-Thiaxanthene Hydrogen Oxalate

STEP A

By replacing the 3-dimethylaminopropyl chloride employed in Example 2, step A by an equal quantity of 1-methyl-3-piperidylmethyl chloride and following substantially the same procedure described in step A of Example 2, there was obtained a mixture of diastereo-isomers of 2-chloro-10-(1-methyl-3-piperidylmethyl)-10-hydroxythiaxanthene. The product thus obtained was triturated with cold hexane. The insoluble α-form was collected and after repeated recrystallization from a mixture of alcohol (No. 3A anhydrous) and water melted at 182–183.5° C.

*Analysis.*—Calculated for $C_{20}H_{22}ONClS$: C, 66.74; H, 6.16; N, 3.89. Found: C, 67.09; H, 6.23; N, 3.86.

STEP B

Concentration of the hexane filtrate affords the β-form that melted at 130–135° C. after repeated recrystallization from hexane.

*Analysis.*—Calculated for $C_{20}H_{22}ONClS$: C, 66.74; H, 6.16; N, 3.89. Found: C, 66.98; H, 6.14; N, 3.90.

STEP C

A suspension of 3.6 g. (0.01 mole) of the α-isomer of 2-chloro-10-(1-methyl-3-piperidylmethyl)-10-hydroxy-thiaxanthene in 15 ml. of dry, alcohol-free chloroform was treated with 2.36 g. (0.03 mole) of acetyl chloride. The clear yellow solution was refluxed for 1½ hours and the solvent then evaporated on the steam bath under reduced pressure. The residue was dissolved in water and the solution made basic with 10 N sodium hydroxide. The mixture was extracted with ether and the ether extract washed with water and dried over anhydrous sodium sulfate. Evaporation of the solvent on the steam bath under reduced pressure left 3.3 g. of semisolid residue. This (base, 2-chloro-10-(1-methyl-3-piperidylmethylene)-thia-xanthene, was converted to the hydrogen oxalate that melted at 208.5–209.5° C. after repeated recrystallization from a mixture of absolute ethanol and absolute ether.

*Analysis.*—Calculated for $C_{20}H_{20}NClS \cdot C_2H_2O_4$: C, 61.18; H, 5.14; N, 3.24. Found: C, 60.98; H, 5.44; N, 3.27.

While the invention has been illustrated to be particularly 10-(3-tertiaryaminopropylidene)-thiaxanthene compounds and particularly methods for the preparation of these compounds, the invention embraces the chemical equivalents of the specifically identified compounds as well as the modifications of the methods described for their synthesis.

What is claimed is:

1. Compounds selected from the class consisting of those having the formula

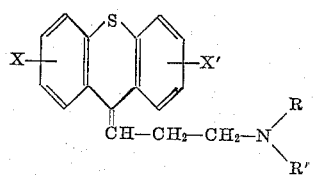

and their pharmaceutically acceptable non-toxic acid addition salts, wherein X and X' respectively is selected from the group consisting of hydrogen, halogen, lower alkyl, lower alkoxy and phenyl and in which

is selected from the group consisting of di-lower-alkylamino, 1-piperidyl, 1-pyrrolidyl, 4-morpholinyl and di-lower-alkylamino in which one of the alkyl radicals is attached to the 2-carbon of the propyl chain to thereby form 1-methyl-3-piperidylmethyl attached to the 10-carbon.

2. A compound having the formula

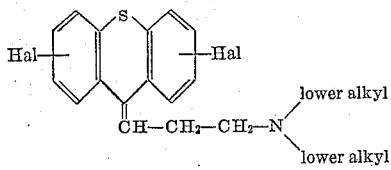

wherein Hal is a halogen.

3. A compound having the formula

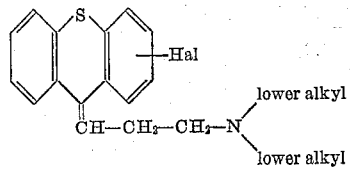

wherein Hal is halogen.

4. 2 - chloro - 10 - (3 - dimethylaminopropylidene)-thiaxanthene.

5. The α-form of 2-chloro-10-(3-dimethylaminopropylidene)-thiaxanthene, the M.P. of the base being 98–99° C.

6. 10-(3-dimethylaminopropylidene)-thiaxanthene.

7. The hydrochloride of the α-form of 2-chloro-10-(3-dimethylaminopropylidene)-thiaxanthene having the melting point of 220.5–221.5° C.

No references cited.